(12) United States Patent
Carlson et al.

(10) Patent No.: US 7,609,877 B2
(45) Date of Patent: Oct. 27, 2009

(54) TACTICAL IMAGE PARAMETER ADJUSTMENT METHOD FOR STEREO PAIR CORRELATION

(75) Inventors: Benjamin Paul Carlson, Lawton, OK (US); William Rodney Ditzler, Ridgecrest, CA (US); Michael R. Havlin, Arlington, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 865 days.

(21) Appl. No.: 11/352,067

(22) Filed: Feb. 9, 2006

(65) Prior Publication Data
US 2007/0183628 A1  Aug. 9, 2007

(51) Int. Cl.
*G06K 9/00* (2006.01)
(52) U.S. Cl. .................. 382/154; 345/419; 706/22; 706/28

(58) Field of Classification Search ............... 382/154; 345/419, 420, 421, 422–427; 706/22, 26–29
See application file for complete search history.

(56) References Cited

U.S. PATENT DOCUMENTS

| | | | | |
|---|---|---|---|---|
| 5,267,329 | A * | 11/1993 | Ulich et al. | 382/103 |
| 5,767,922 | A * | 6/1998 | Zabih et al. | 348/700 |
| 6,163,337 | A * | 12/2000 | Azuma et al. | 348/43 |
| 6,668,082 | B1 * | 12/2003 | Davison et al. | 382/190 |
| 6,687,386 | B1 * | 2/2004 | Ito et al. | 382/103 |
| 2002/0051582 | A1 * | 5/2002 | Go | 382/240 |
| 2006/0038017 | A1 * | 2/2006 | Carlson et al. | 235/462.24 |

* cited by examiner

*Primary Examiner*—Samir A. Ahmed
*Assistant Examiner*—Aklilu k Woldemariam
(74) *Attorney, Agent, or Firm*—David S. Kalmbaugh

(57) ABSTRACT

A method for the timely processing of tactical images which allows a military pilot adequate time to track and engage a target. The method uses a correlation process and back propagated neural network to home in on a correct position parameters for the tactical image including the heading and the range for the tactical image.

20 Claims, 8 Drawing Sheets

Range values of templates using R as the sensor given range are:

R−1000  R−500  R  R+500  R+1000
  A      B    C    D      E

Red template consists of:

0.0*A + .25*B + .5*C + .75*D + 1.0*E

A ⊕ B ⊕ C ⊕ D ⊕ E =

Green template consistes of:

1.0*A + .75*B + .5*C + .25*D + 0.0*E

A ⊕ B ⊕ C ⊕ D ⊕ E =

TACTICAL IMAGE PARAMETER ADJUSTMENT METHOD FOR STEREO PAIR CORRELATION

BACKGROUND OF THE INVENTION

1. Field of the Invention

The present invention relates generally to tactical reconnaissance image processing. More specifically, the present invention relates to a method for the timely processing of tactical images which allows a military pilot adequate time to track and engage a target.

2. Description of the Prior Art

Today, real-time image correlation systems are being integrated into various aircraft in the U.S. Military's aviation arsenal. One example of an image correlation system is the DPSS system used on the Navy's F/A-18 aircraft.

In modern warfare, timely extraction of target coordinates for use by a military aircraft pilot from tactical reconnaissance images provided by real-time image correlation systems is a critical restriction in the targeting loop. A military pilot generally has immediate access to real time sensor images provided by sensors located on the aircraft. However, extracting the true coordinates of a target the pilot is tracking and then engage can be time consuming and is often difficult. Usually, the sensor provides a target's basic parameters such as range, heading, and depression angle with respect to a sensor platform, which are used to correlate the target's image with an on-line database of stereo images. However, these parameters are often in error due to errors in the aircraft inertial navigation system.

Tactical reconnaissance images produced by various sensors on board the aircraft need to be registered (correlated) with stereo paired images on file in order to extract various positional information from the images.

Unfortunately, dynamic position data, which is data providing the position of the aircraft's sensors with respect to the area being viewed, and which is necessary to transform a combined image template created from the stereo pairs to a tactical image plane, is not always accurate. Unfortunately, the range position data can be off by as much as 3000 meters. While the other position data may also be in error, the errors in range position data are usually larger and introduce more serious problems later.

Accordingly, there is a need to develop a method for determining the correct range of a target which utilizes a comparison with the stereo image data and a template created from them. Further, the method will eventually need to create multiple templates and determine the correct range adjustments based on a metric comparing the stereo image data with the tactical image or target.

SUMMARY OF THE INVENTION

The tactical image parameter adjustment method for stereo pair correlation includes a registration algorithm which creates an edge template using stereo image pairs and tactical image position data provided by a sensor on board an aircraft of the like. This edge template is matched in the frequency domain using the Fast Fourier Transform to the edge image created from the tactical image position data. This matching process creates a three dimensional correlation map. When there is a successful correlation, the required translational coordinates are represented by the coordinates of the highest peak on a correlation surface map. The coordinates of this peak will generate two dimensional translational parameters to correlate the images. However, the process fails when the tactical image's position parameters are in error.

A parameter adjustment algorithm comprising two composite templates is created with each composite template using the same set of parameter values but three different weights for the parameter values. The different weights allow a user to combine three templates for red and three for green into the two composite templates which will correlate differently based on the difference between a given parameter value from the true value. The weights for the red template are 0.0, 0.5 and 1.0 while the weights for the green template are 1.0, 0.0.5 and 0.0.

A parameter of interest (POI) minus 20% of its useful range (the range that the algorithm will generally be successful) is used with the first weight, the actual POI value is used for the second and the POI plus 20% for the third edge template. The edge templates (three for the red and three for the green) are then combined to create the two red and green templates in the frequency space.

Next, these two templates are each correlated in frequency space with the tactical edge image to create two three dimensional correlation surfaces. Due to the value of the weights, the red template correlates better when the given parameter value is smaller than the true value, green correlate better when the given parameter value is larger than the true value, and the red and green templates generally correlate about equal when the values are equal. From the correlation surfaces, the peak and minimum values are found and the minimum value is subtracted from the peak value to remove some of the variability in these values.

The ratio of the best correlation values after the minimum values are subtracted out, along with the ratio of the peak height over peak width for each of the best values, contain patterns which can be analyzed by a neural network.

A back-propagation neural network is trained using 2000 sets of the three values standardized to fall between 0.0 and 1.0. A separately trained network is required for each different parameter networks, that is a network for range and a network heading adjustment are implemented.

The back-propagation neural network, when presented with a new set of values, also standardized, returns a value indicating whether the given parameter value is to small or to large. Based on the returned value, a binary search homes in on the correct value. The binary search is implemented by adjusting the parameter of interest, decreasing the step size (the value that will be used to adjust the parameter of interest) and looping back to the step where the parameter adjustment algorithm which comprises two composite templates is created. The process continues until a search is complete, which is usually determined by either a counter or a flag that indicates the correct value has been found.

The algorithm first performs a coarse binary search adjustment on each parameter specified as being incorrect and then a fine binary search adjustment for each parameter specified as being incorrect. This two step process is not needed when only one parameter is in error. However, it is necessary when multiple parameters are found to be in error.

DETAILED DESCRIPTION OF THE PREFERRED EMBODIMENTS

Figure 1:
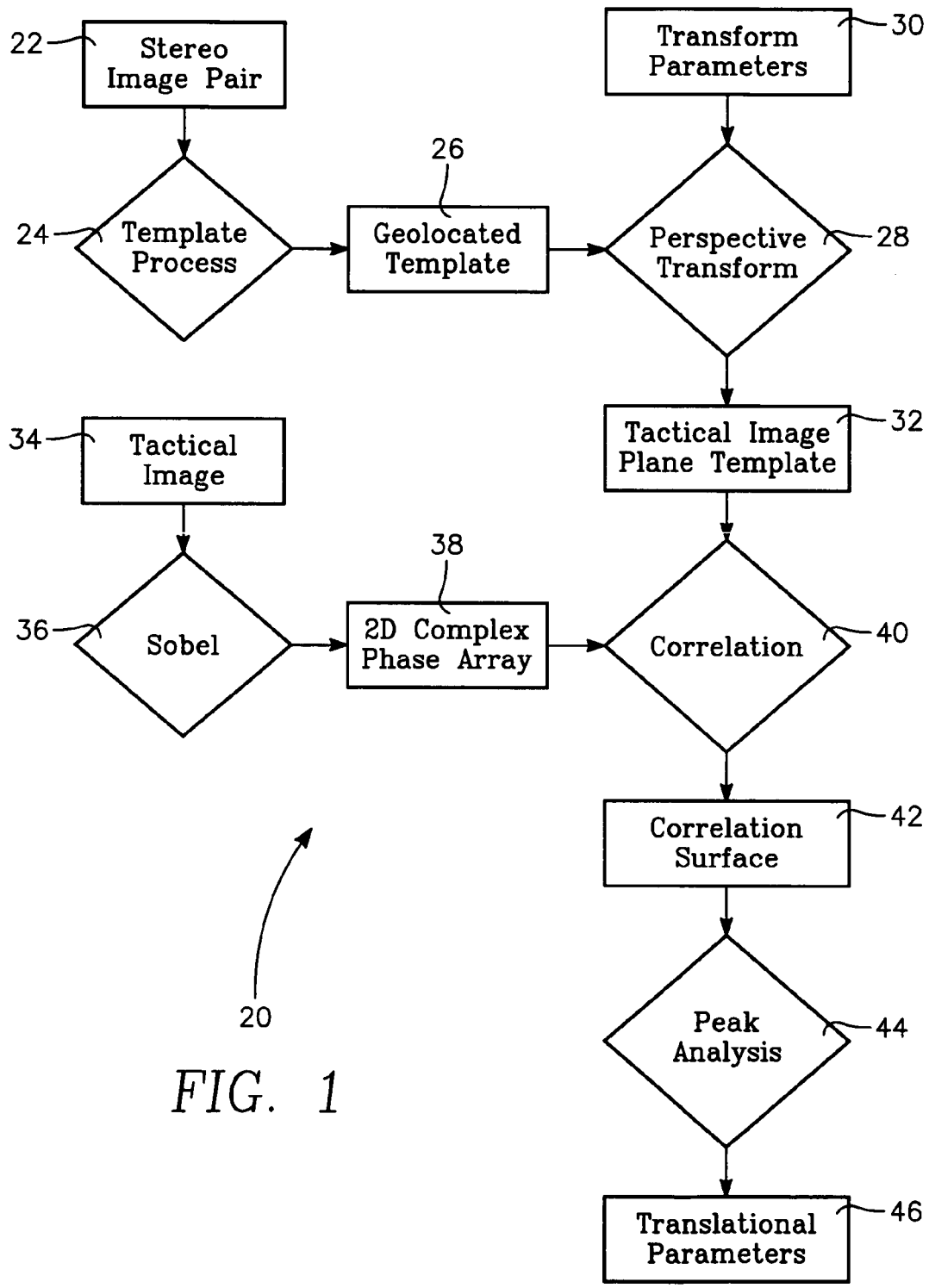
FIG. 1 is a flow chart illustrating a Digital Precision Strike Suite (DPSS) image correlation method without a parameter adjustment function which comprises a first embodiment of the present invention.
Figure 4:
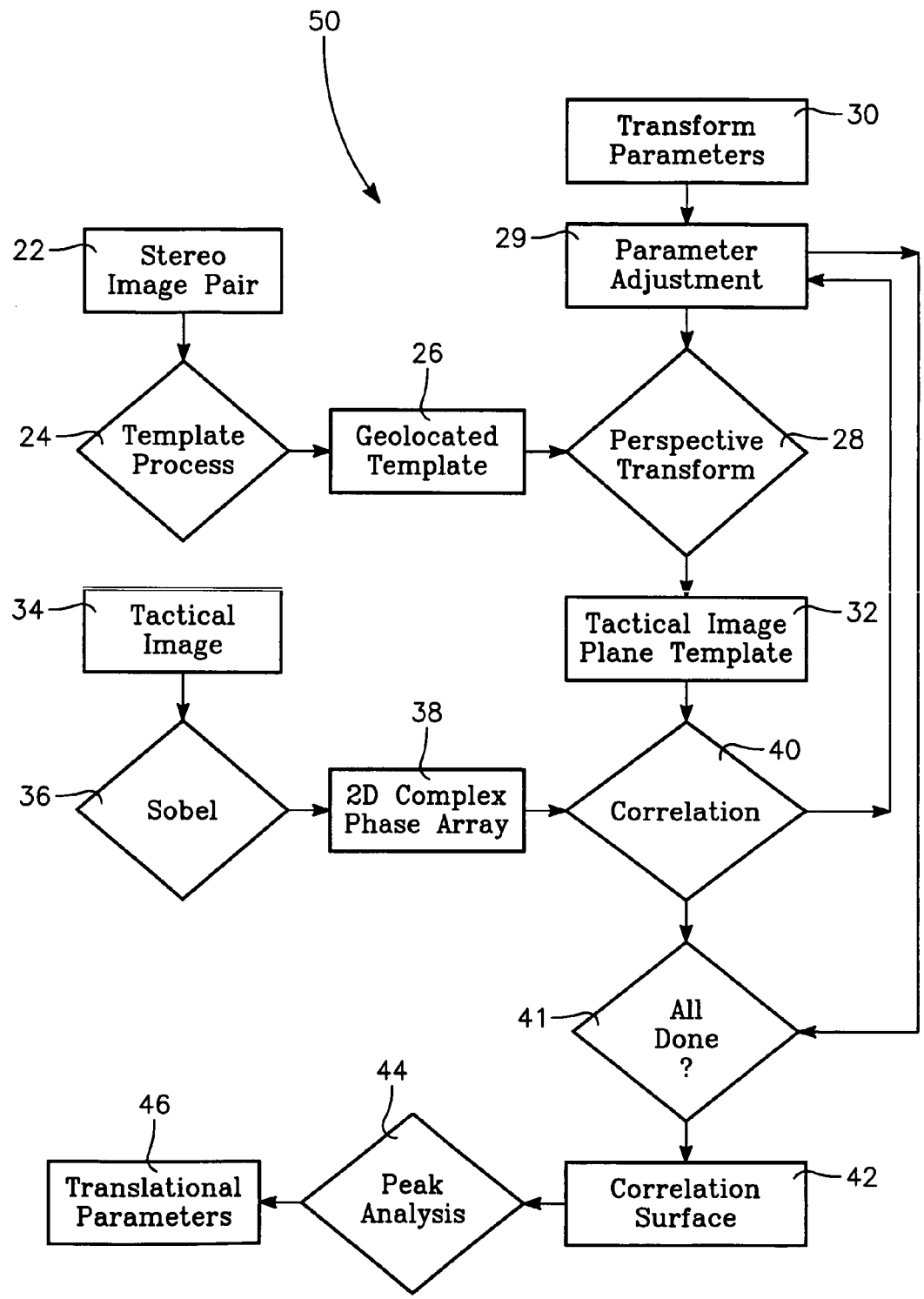
FIG. 4 is a flow chart illustrating a Digital Precision Strike Suite (DPSS) image correlation method with a parameter adjustment loop which comprises a second embodiment of the present invention.
Figure 6:
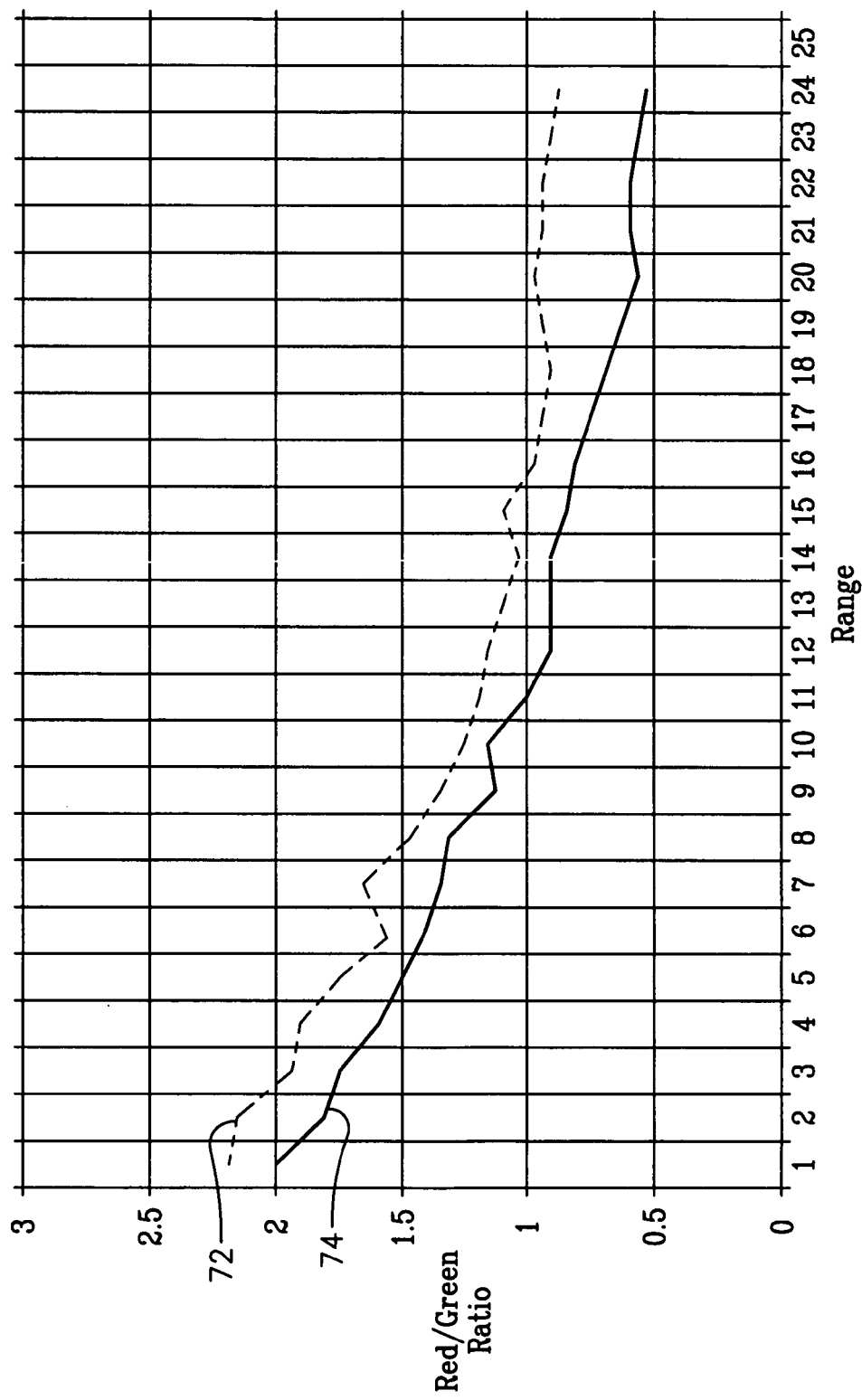
FIG. 6 is a graph showing a comparison of two range templates for two different images.

Referring to FIGS. 1 and 6, there is shown in FIG. 1 a flow chart of a Digital Precision Strike Suite (DPSS) image correlation method 20 without a parameter adjustment function which comprises an embodiment of the present invention. FIG. 4 depicts a flow chart of a Digital Precision Strike Suite (DPSS) image correlation method 50 with a parameter adjustment system 29 which comprises another embodiment of the present invention.

The DPSS image correlation method 20 is a template matching process. The DPSS image correlation method 20 starts with a stereo pair of reference images 22 of the area being viewed by a sensor on board a military aircraft. The reference images 22 come from a large image library which has been mensurated and the coordinates for the images 22 are geolocated in the real world. This pair of reference images 22 is converted through a template process 24 into a three dimensional geolocated template 26, which is list of the strongest edge features in the reference images 22. The template points for the reference images 22 are then transformed into the image plane of the sensor, based on the most accurate available data on sensor location and orientation. A perspective transform 28 of template 26 to a tactical image plane template 32 is performed with externally provided transform parameters 30.

Finally, the transformed tactical image plane template 32 is correlated with the edges in a sensor tactical image 34. The position of the correlation peak 44 from correlation n surface 42 determines the correspondence between the target location in the sensor tactical image 34 and the mensurated coordinates of the reference stereo image pair 22. Peak analysis is performed to extract translational parameters 46. The translational parameters 46 are then used to match the tactical image 34 with library images such that geolocated coordinates are available for the tactical image 34.

At this time it should be noted that SOEBEL 36 is an operator 3-D spatial gradient measurement on an image and as such emphasis regions of high spatial frequency that correspond to edges. SOBAL is utilized to find an approximate absolute gradient magnitude at each point in an input gray scale image. SOBAL provides a 2-D complex phase array 36 of tactical image 34 for use in the correlation process 40.

FIG. 4 illustrates Digital Precision Strike Suite image correlation method 50, which has a loop with a parameter adjustment system 29. A parameter adjustment algorithm comprising two composite templates is created with each composite template using the same set of parameter values but different weights for the parameter values.

Figure 7:
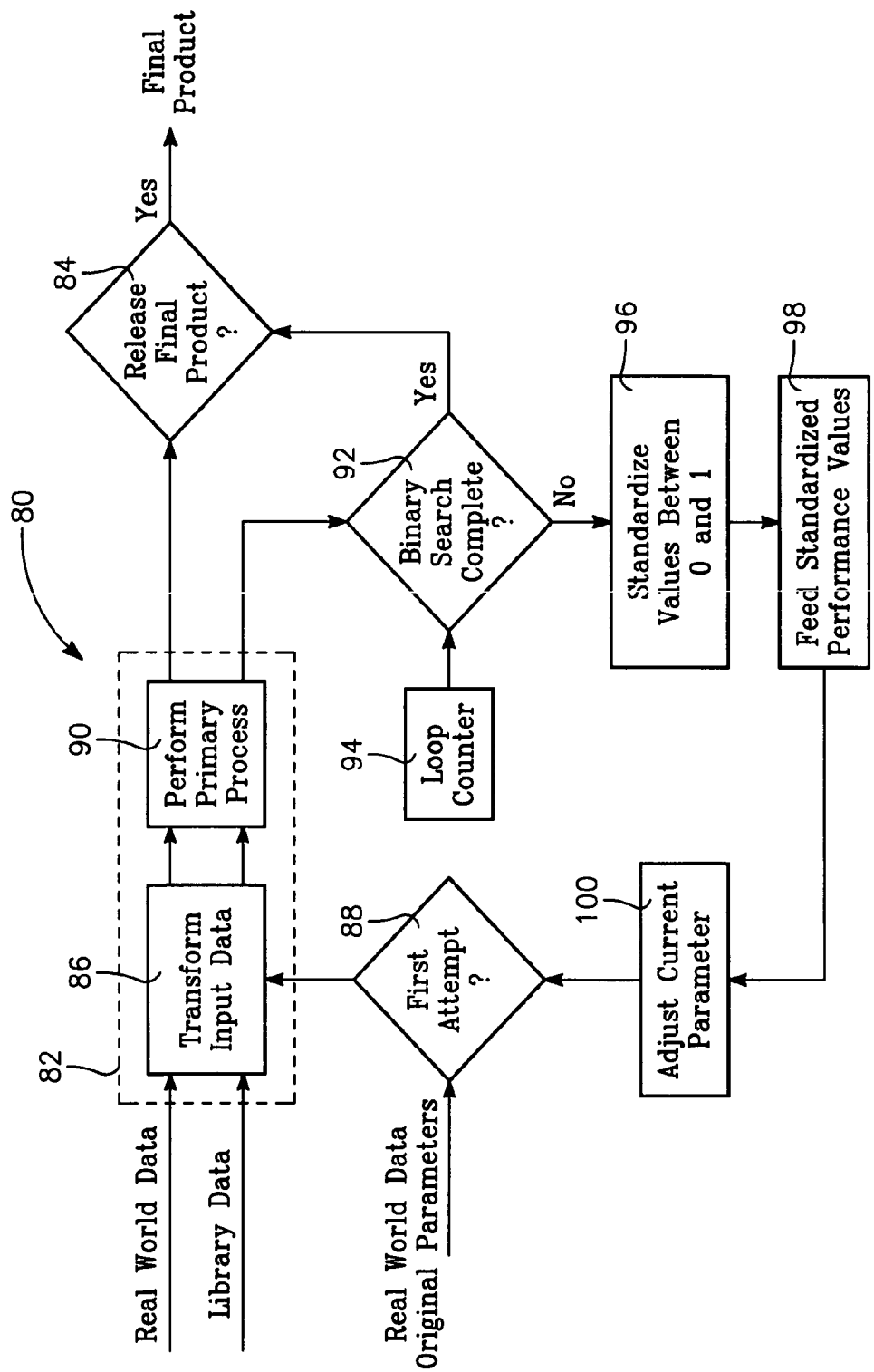
FIG. 7 is a block diagram illustrating the parameter adjustment loop of FIG. 4.

Referring to FIGS. 4 and 7, FIG. 7 illustrates the parameter adjustment loop 80 for Digital Precision Strike Suite (DPSS) image correlation method 50. Parameter adjustment loop 80 uses a binary search algorithm to adjust parameters such as range and heading. The parameter adjustment loop 80 may include custom adjustments based on need and type of data. Real world data and library data are provided to primary system 82. Primary system 82 performs certain functions on data using adjusted data position values. Primary system 82 also generates a final product when parameter adjustments are complete. The final product is supplied to a decision block 84 which decides whether or not to release the final product. Primary system 82 includes a transform input data block 86 which uses real world data parameters supplied by a first attempt decision block 88 to transform the real world data and the library data. First attempt decision block 88 receives the real world data parameters including range, depression angle with respect to a sensor platform, azimuth angle and roll angle and supplies the real world data parameters to transform data block 86 when the transform is the first attempt. Otherwise an adjusted parameter value is supplied to block 86.

A perform primary process block 90 receives the transformed real world and library data, processes the data and supplies a final product to decision block 84 or a primary system generated performance values to a binary search complete decision block 92. A loop counter 94 is incremented until a search is complete. This process continues until a search is complete, which is usually determined by counter 94 or a flag that indicates the correct value has been found and the final product can be released.

When the binary search is not complete the performance values are standardized to values between 0 and 1 based on maximum and minimum values from data used to train a neural network (block 96). The standardized performance values from block 96 are fed to a back-propagation artificial neural network (BP-ANN) which generates a BP-ANN output of between 0.0 and 1.0 (Block 98). An adjust current parameter block 100 increases the parameter by a step value if the BP-ANN output value≦0.5 and decreases the parameter by a step value if the BP-ANN output value>0.5. The newly adjusted parameter value is supplied to decision block 88.

Figure 2A:
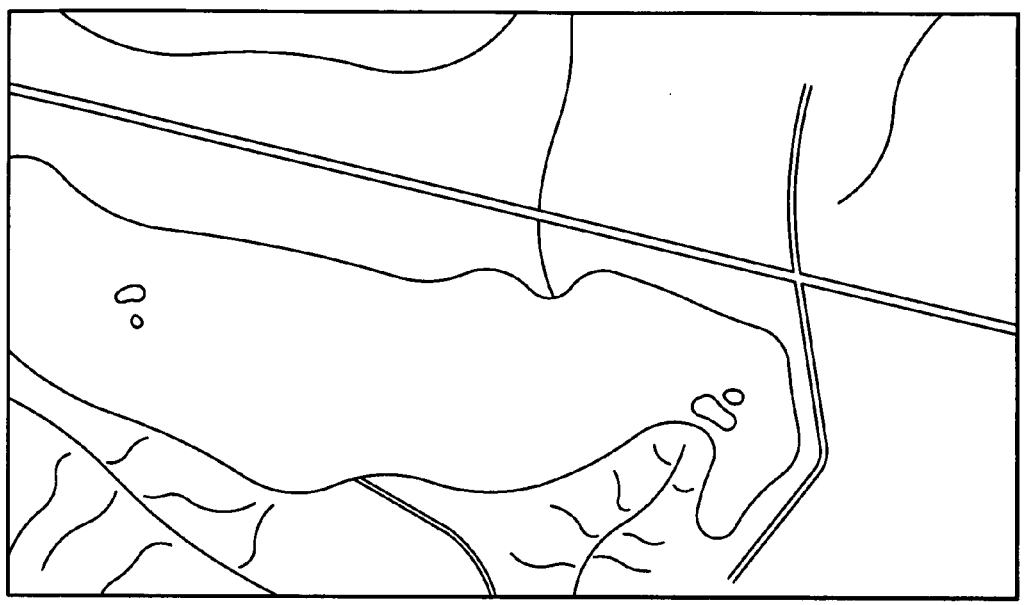
FIGS. 2A-2D illustrate a template making and matching process for the present invention which uses a single reference.
Figure 2B:
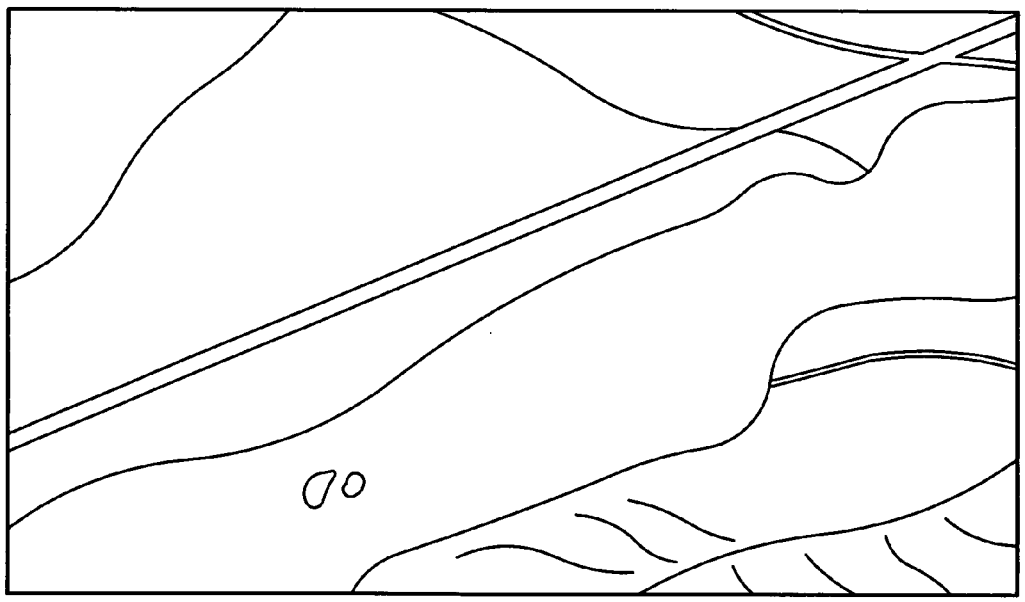
Figure 2C:
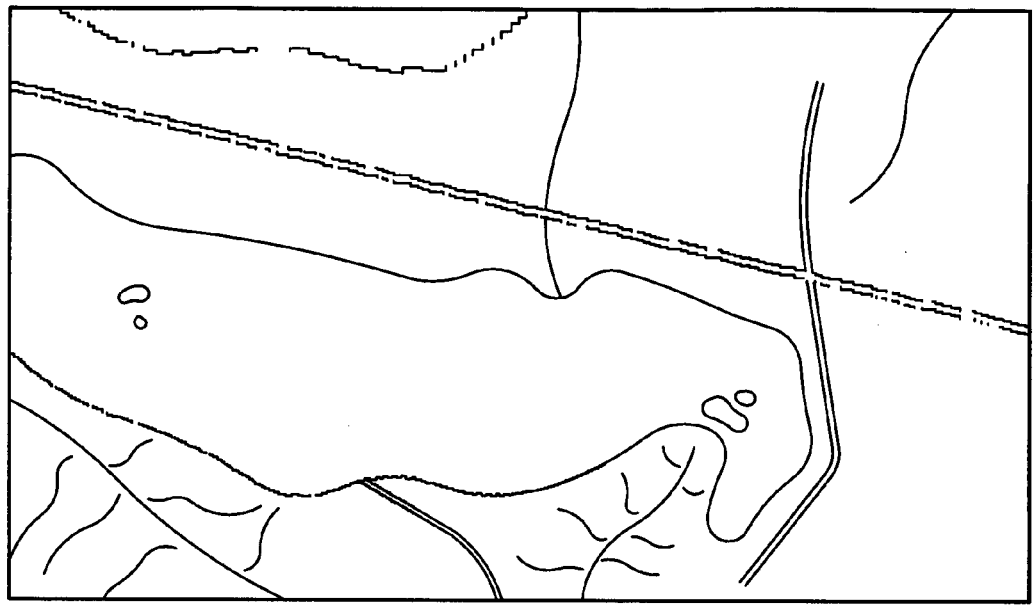
Figure 2D:
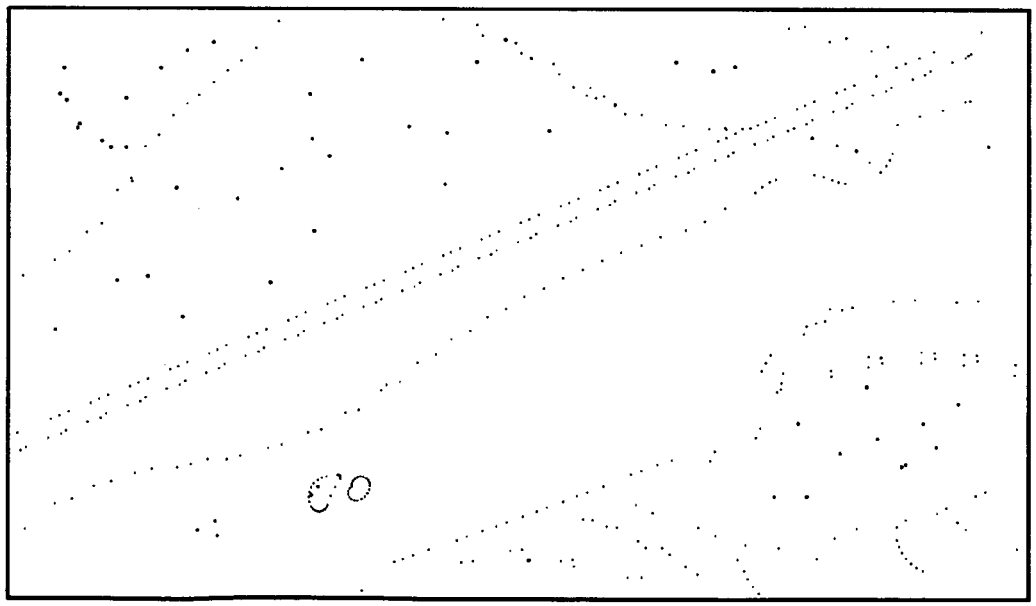

Referring to FIGS. 2A-2D, FIG. 2 depicts a simple example with a single image in FIG. 2A representing a stereo pair. FIG. 2A shows the reference image which is an aerial photo, and FIG. 2B shows the sensor tactical images. FIG. 2C shows the initial edge template and FIG. 2D shows the transformed edge template created from the single reference image of FIG. 2A which is correlated to the tactical sensor image of FIG. 2B.

Stereo templates are built using stereo images which are then projected onto a tactical image plane using a sensor's position parameters such as range and heading.

The first step in a correlation algorithm is to create an edge template 26 using stereo image pairs 22, which is then projected onto tactical image plane 32 using the sensor position data 30 (FIG. 1). The edge template 26 is matched in the frequency domain using a Fast Fourier Transform to a gradient image which is similar to an edge image and is created from the tactical image 34. The result is a three dimensional correlation map or surface 40. If there is a successful correlation 40, the required translational coordinates 46 are represented by the coordinates of the highest peak 44 on the correlation map 42. The coordinates of the peak provide the required values to register the tactical image 34 and thus, extract geolocated coordinates from the tactical image 34. However, if the range used to project the edge template is incorrect, an accurate correlation does not occur. A peak in the correlation surface 42 is generally used, along with other information, to make an estimate of the correct range.

This is the starting point for a template coloring algorithm which allows the user to make an accurate estimate of the range.

Normally, an image created by extracting the edges detected from another image is a binary image, i.e. the edge pixels are ones while the non-edge pixels are zeros. Weighing the edge values in a template and comparing the peak correlation value of the template with another edge template created using a different range and weight, provides relevant information about the relationship between the ranges used to create the edge templates and a tactical image's true range. Multiple templates with different ranges and weights are then created and combined into one template for correlation.

Figure 3:
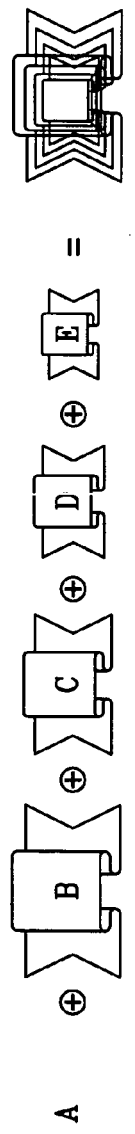
FIG. 3 illustrates a graphical of red and green template construction for the template coloring algorithm used in the present invention.
Figure 3:
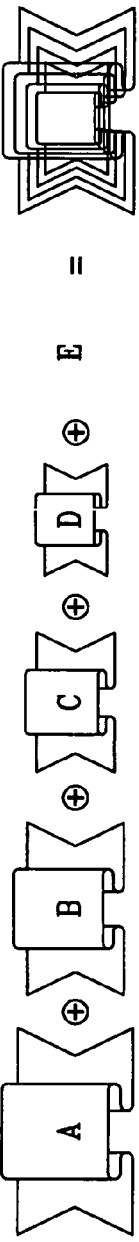

Referring to FIG. 3, two composite templates, each using the same set of ranges but different weight values, are generated. A red template and a green template comprise the two composite templates of the template coloring algorithm. Initially, 11 different ranges were developed. The ranges are numbered from 0 to 10, and increase from approximately 1000 meters closer than a given range R to 1000 meters further than the given range R. If, for example, the sensor given range is 5800 meters, range 0 (R−1000) would be 4800, range 5 (the given range in the middle R) would be 5800 meters and range 10 (R+1000) would be 6800. The template weight values for the first composite template/red template start at 0.0 and increment to 1.0 while the values for the second composite template/green template start at 1.0 and decrement to 0.0.

At this time it should be noted the terms red and green, which describe the templates, are arbitrary terms used to distinguish templates of heavier weights for small and large values of a search parameter. In this particular case red and green distinguish range templates. The terms red and green could also be used to distinguish templates for a search parameter such as heading. Other terms could be used to describe the templates such as sweet and sour.

FIG. 3 gives an example of this using only five ranges. The red template in FIG. 3 is represented by the following expression:

$$0.0*A+0.25*B+0.5*C+0.75*D+1.0*E$$

The green template in FIG. 3 is represented by the following expression:

$$1.0*A+0.75*B+0.5*C+0.25*D+0.0*E$$

It should be noted that template 0 (template A) does not contribute to the red template and template 4 (template F) does not contribute to the green template).

The maximum value from the green correlation surface should be larger than the maximum value from the red correlation surface when the given range is further than the true range, since the range template weights closer to the true range (which are the closer ranges) have larger values. Further, the maximum value from the red correlation surface should be larger than the maximum value from the green correlation surface for given ranges closer than the true range for the opposite reason. Also, if the given range is fairly close to the true range, the maximum correlation values should be approximately equal. Given the above criteria, a user can extract data about how far the true range is from the given range based on the ratio of the red and green maximum correlation values.

The basic correlation algorithm is further refined to enhance performance, since the peak value of a correlation surface can vary greatly depending on multiple factors. The peak value is standardize by subtracting the correlation surface minimum value. Also, since 11 range points did not provide enough granularity to return good, consistent values, eighty one range points or individual range templates were utilized to determine the true range.

Figure 5:
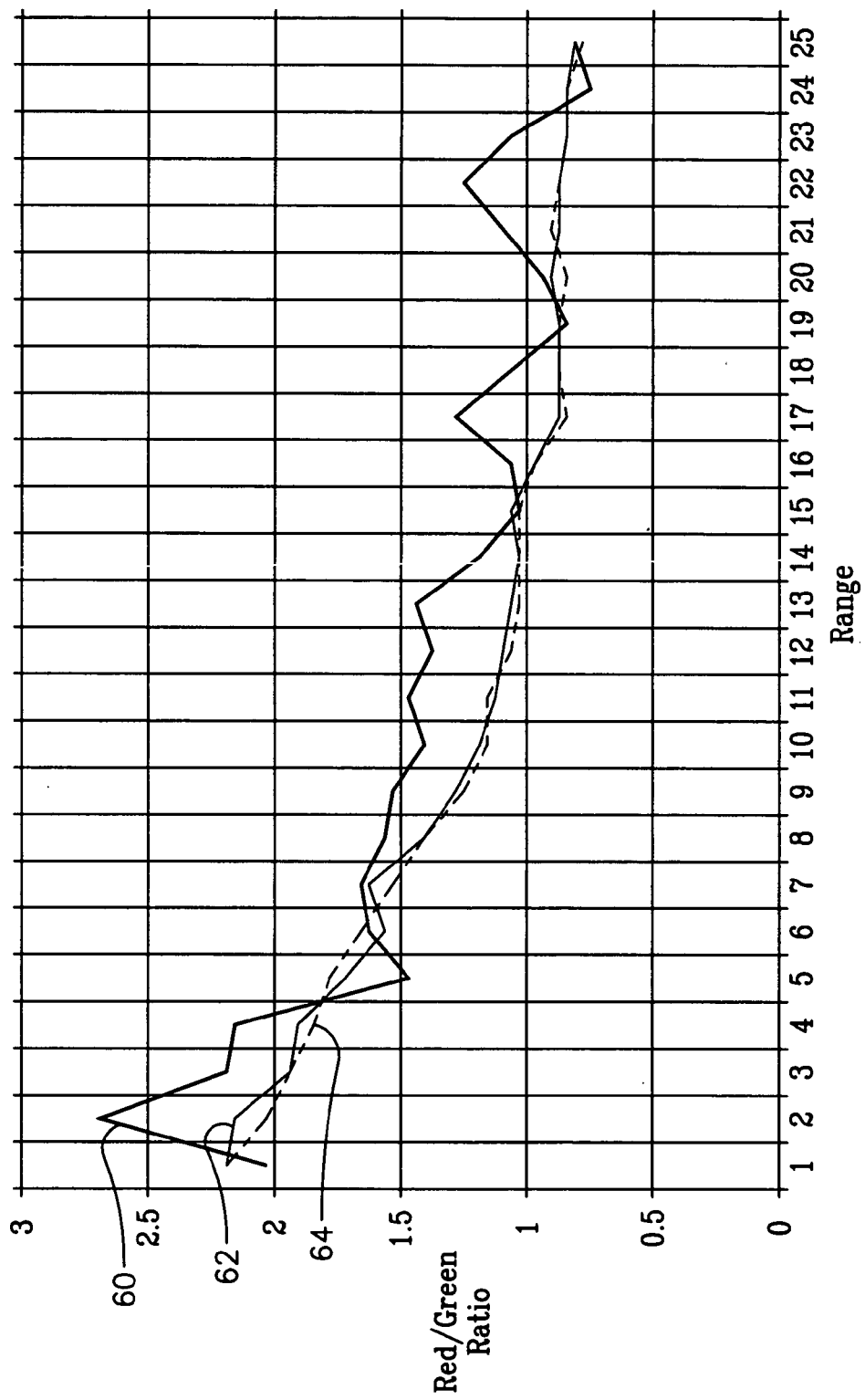
FIG. 5 is a graph showing range on the X-axis and red/green standardized ratios on the Y-axis which illustrates the smoothing effects achieved by increasing the number of range templates.

Once the method of creating the red and green composite templates and extracting useful data from them was developed, evaluations were performed on several images to determine the shape of graphs created by using various ranges within 1000 meters of the true range. Utilizing a graph with range on the X-axis and the red/green standardized ratios on the Y-axis, should result in a Y value of approximately one when the range is equal to the correct range. In addition, there should be a negative slope from left to right. With minor exceptions caused by noise or image anomalies, FIG. 5 illustrates three plots 60, 62 and 64 which compare the smoothing effects on the plots 60, 62 and 64 using an increasing number of range templates on each plot 60, 62 and 64. The true range point is thirteen where the Y value of plots 62 and 64 approximate one. Plot 60 was generated using eleven range templates, plot 62 was generated using eighty one range templates, and plot 64 was generated using one hundred twenty one range templates.

While all of the graphs 60, 62 and 64 have the same basic shape, their position on the vertical axis is determined primarily by the makeup of the image, that is how many lines and corners are there in the image, and how much vegetation and how much open space is contained within the image. Therefore, if given a value, it is difficult to determine on a specific graph where the value should lie and, thus, how far off the range is. This deficiency is illustrated in FIG. 5 where two graphs 72 and 74 from two sensor images are compared using eighty one range templates/range points. The true range is at point 13 with one plot 72 above one and the other plot 74

When exploring the algorithm using only 3 range templates (one at −200, one at the given range and one at +200 meters) patterns in the data pointed to an approach for obtaining an accurate range reading which consist of a search algorithm utilizing a neural network to provide accurate range data.

The combination of the red/green ratio values (as shown in FIGS. 5 and 6) with two additional values shows a pattern that proved to be exploitable using a standard back-propagation artificial neural network. The other two values are the ratio of the red correlation's peak height with its width and the ratio of the green correlation's peak height with its width. Using these three values (standardized to fall between 0 and 1) as the inputs to a neural network trained on similar sets, the user can determine the true range for the tactical image 34.

A training set of 2000 patterns was generated from three different images and a 41-pattern test set from a fourth image, all using ranges varying from the true range by 1000 meters. The desired output from the neural network was a number between 0 and 1 which represented the required adjustment to the given range. After many trials, this approach was deemed to be sufficiently accurate to continue its use, even though the approach achieved training errors of only 20% and testing errors of only 30%.

A neural network that reports whether the range was too small or too large proved satisfactory for an accurate determination of the true range of a tactical image. From this, a custom binary search algorithm produced an accurate estimate of the true range. After testing numerous network architectures, a training error of only 6% and a testing error of only 8% were achieved. This result was achieved using a single hidden layer of 56 nodes and training for several hundred thousand epochs while occasionally modifying the learning rate between 0.001 and 9.0. The 9.0 value is needed on occasion to jog the network out of a local minimum. The final weights can be very large. For the network, the loop and the network were implemented into the correlation code.

The implementation of the binary search algorithm included fine tuning and rules customized to this specific problem. First, it was decided that when the initial direction was determined a range adjustment was required i.e., there was a need to add to or subtract from the current range. The initial step size was set at 300 meters. Also, if during the first iteration, the starting point is with a fairly large/small range and the first neural network output indicates that there is a need to increase/decrease the range, then the range is decreased/increased by 200 meters, as opposed to 300 meters. This approach recognizes the fact that, quite often, if the starting range is on the far extreme of the operating range of 1000 meters, it is quite possible that the neural network will start off in the wrong direction. Thus, by off setting the range by several hundred meters, there is an increase in the probability of eventually achieving the correct range. Iterating 10 times provides very good results in a reasonable amount of time which is about 4 seconds on a general purpose computer.

The step size is kept at 300 meters until it is found that the true range has been overshot and there is a need to repeat the iteration process. At this time the process decrements the step size by 50% for each iteration. At 10 iterations, the search is stopped. While there are some unusual details of this implementation, such as starting at 300 meters and not reducing the step size until there change directions, these have been found to work best in this problem domain and are very robust to perturbations at specific points. In other words, if the neural network gives incorrect values from −300 meters to −280 meters, this algorithm is able to overcome this and still stop fairly close to the true range.

The range adjustment method was also implemented with adjustment of the sensor heading. In five sensor images used for training and testing, all five had headings which were off by 2 to 4 degrees. Training and testing pattern files were constructed very similar to the sets used for training the range network. However, more patterns from a total of four images were used for training. The neural network was trained using images with headings within 5.0 degrees of the true heading. The final network consists of a single hidden layer using 30 nodes and was trained for several hundred thousand epochs with a learning rate of between 0.001 and 4.0.

The range adjustment method with sensor heading adjustment functioned in accordance with expectations. In addition, the looping algorithm requires no special rules, but is a simple binary search with an initial step size of 4 degrees. Even using images not examined heretofore, the network provided very accurate heading adjustments with a given heading within 5 degrees of the true heading. In very sparse images with little to correlate on, the range adjustment method with heading adjustment does not work as well. However, in many circumstances, correct adjustments were achieved out to 6 degrees or more. Most adjustments came within 0.5 degrees of the true heading and were more than sufficient for accurate correlation results to be achieved.

From these results, an algorithm was generated which would be able to adjust both the range and heading simultaneously. It was determined that the range was much less dependent on a correct heading than the heading was on a correct range. Range was found within 200 meters even when the given range was off by 1000 meters and the heading off by 4 or 5 degrees. Obviously, the more off the heading is, the worse the range adjustment performs. An algorithm was developed that performs a rough adjustment of the range and heading and then a fine adjustment of the range and heading in about 10 seconds using a Pentium IV, 2 GHz Personal Computer. The search algorithms described above remain unchanged except for the fact that, on the fine adjustments, the search algorithms start off with a step size of 150 meters and 2 degrees, or half of the step size for the coarse adjustments. This has proved very successful and has been tested on 12 additional sensor images.

The range adjustment results, while quite good, are rather difficult to quantify in a tabular or graphical format. Initially, five different sensor images were used, three of which were used for training and one for testing of the network, and one which was untouched. However, the three images used for training were quite large and only two frames from each image were used for training which left most of the area in the images still available for final testing. The testing consisted of extracting three different frames from each image with each frame being about ⅛ of the total image and representing as wide a variety of landscapes as possible. Each of the 15 extracted frames were then tested using about 10 different ranges within 1000 meters of the true range with some as far out as 1300 meters. In almost all cases, performance was very good and a range within 50 meters of the true range was achieved along with a very good image correlation/registration at least 90% of the time.

In some instances, the operating area was reduced to about 800 meters. This generally occurred in frames which contained very few man-made objects. An example is a field consisting of mostly sage brush and other small bushes. Ranges were still obtained that were within 50 meters of the true range when the initial range was within 800 meters of the true range. Outside of this operating area, performance drops off until, at about ±1500 meters, accurate results were rarely obtained. However, even when the correct range was not found, quite often the new range would be closer to the true range than the initial range and a second correlation attempt would provide the true range. Thus, if the true range is not known in a real world operating environment and the first correlation attempt does not produce accurate results, a second correlation attempt will likely achieve the desired result.

Finally, an attempt was made to provide improved correlation results through the use of a larger and more diverse training set. When training a neural network, the larger, more diverse, and more representative of the true data that is included in the training set, the better the network will perform on-line.

However, this was not found to be the case in this application. The training set was increased 50% by using another image for training and by using more frames from the original three images. Also, there was an increase the range from ±1000 meters to ±1200 meters. While this achieved much better training and testing error rates, which were down from 6% and 8% to about 4% and 2%, the actual network performed as well when implemented in the correlation software. However, the performance results achieved were not close to the results achieved using the neural network trained from the smaller training set. It is believed that the reason for this is the increase in the range covered by the new data to ±1200 meters. The further the range of a sample pattern is from the true range, the less of a distinguishable pattern is present, that is there is more noise, and less reliable data. At approximately 900 to 1000 meters, the accuracy of the range information is substantially reduced. Therefore, the addition of ranges out to ±1200 meters may actually decrease overall performance instead of increasing it.

The findings of the heading adjustment are very similar to those of range adjustment, albeit slightly better. When testing with all other parameters correct, we were able to achieve headings within about 0.5 degrees (and usually within 0.2) almost every time (95%) when the given heading was within 5 degrees and quite often even out to 7 or 8 degrees from the true heading. As with the range, even when the first attempt does not get us the correct heading, the new heading is closer and a second attempt will usually produce the correct heading.

With the combined range and heading adjustment algorithm, many different combinations were attempted. The most reliable algorithm uses two adjustments of both range and heading and a search loop of 4 iterations for the first range adjustment, 5 iterations for the first heading adjustment and the second range adjustment, and 6 iterations for the second heading adjustment. When these numbers were increased or when three adjustment cycles were used, minor improvements in performance were noted in some situations while in others, performance decreased.

Evaluations were performed on the original five images as well as an additional set of twelve images. When either the given range or heading was correct, it was found that the other parameter could be off by quite a bit, for example, 1000 meters or 7 degrees, and still be adjusted correctly. Also, when either parameter is off by an increasing amount, tolerance by the algorithm for the other parameter also being off decreases. The net result is that reasonably good performance is achieved in most cases with ranges within 800 meters and headings within 4 degrees of the correct values. The combined adjustment, if not achieved on the first attempt, will quite often be found on a second or even third attempt. On occasion, when the first attempt actually adjusts the values in the wrong direction, a second attempt may compensate for this and produce the correct values. Finally, for values that are already correct or very nearly correct, the algorithm is very reliable at leaving the values nearly unchanged.

The method of tactical image parameter adjustment for stereo pair correlation receives inputs which are a stereo image library and a tactical image with sensor position parameters. The steps to process this data using the method of the present invention are set forth as follows:

1. Extract stereo pair from a library based on a rough estimate of sensor position. The user selects an area corresponding to a tactical image from the stereo pair.

2. Create a tactical edge image from the tactical image for use in a correlation process.

3. Create two red and green combined edge templates in frequency space. Each template consists of three to five differently weighted individual templates created using a given parameter of interest (POI) and the POI±20% of the operating range for the POI (±200 meters to ±500 meters for the range, ±1 degree for the heading).

4. Correlate the tactical edge image with the 2 red and green combined edge templates to create two solution surfaces.

5. Find peak and minimum values in each frequency space and subtract the minimum value from the peak value for each frequency space.

6. Create three ratio values as inputs to a back-propagation neural network comprising:
   (a) a ratio of a red peak over a green peak.
   (b) a ratio of a red peak height over a red peak width.
   (c) a ratio of a green peak height over a green peak width.

7. Standardize the three ratio values based upon all values used for training the back propagated neural network. Feed the three ratio values to the back-propagation neural network to determine a search direction.

8. Adjust the point of interest based upon a current search direction and a step size for the operating range.

9. Decrease the step size by half for the operating range.

10. When a binary search is complete, the method continues to step 11, otherwise, return to step 2.

11. If the previous search was to determine a course search then set variables for fine search and start a new search using the first Point of Interest to be adjusted.

The outputs include tactical image with corrected position parameters. Mensurated and registered tactical image with real world coordinates are made available.

Under normal conditions, without the parameter adjustment enhancement, the DPSS code performs step 1 then simply create a single template in frequency space using the given tactical image parameters and the stereo pair. This single template is then used to correlate with the tactical image to produce the final product. If the tactical parameters are incorrect then the final product will not be correlated correctly and the user needs to adjust the parameters manually and try again. This process must be continued until an accurate correlation is achieved.

From the foregoing, it is readily apparent that the present invention comprises a new, unique and exceedingly useful tactical image parameter adjustment method for stereo pair correlation which constitutes a considerable improvement over the known prior art. Obviously, many modifications and variations of the present invention are possible in the light of the above teachings. It is therefore, to be understood that within the scope of the appended claims that the invention may be practiced otherwise than as specifically described.

What is claimed is:

1. A tactical image parameter adjustment method for stereo pair correlation for determining a range for a tactical image comprising one or more computers implementing in the following steps:

(a) providing tactical image position data generated by a sensor;

(b) providing stereo image pairs which are stored within an image library wherein said stereo image pairs are based on a rough estimate of sensor position;

(c) generating an edge image template from said tactical image position data for use in a correlation process;

(d) generating first and second red and green combined edge templates in frequency spaces wherein each of said red and green combined edge templates consists of a preset number of differently weighted individual templates created using a parameter of interest;

(e) correlating said edge image template with said first and second red and green combined edge templates to provide first and second correlation surfaces;

(f) locating peak and minimum values in each of said frequency spaces in said first and second correlation surfaces;

(g) subtracting the minimum value from the peak value for each of said frequency spaces in said first and second correlation surfaces;

(h) generating first, second and third correlation values as inputs to a neural network wherein said first, second and third correlation are ratios of selected values of peak widths, peak heights and said peak values;

(i) standardizing said first, second and third correlation values to fall between 0.0 and 1.0; and (j) providing said first, second and third correlation values standardized to fall between 0.0 and 1.0 to said neural network, wherein said neural network using said first, second and third correlation values determines a search direction, and then homes in on a correct value for the range of said tactical image.

2. The tactical image parameter adjustment method of claim 1 wherein each of said red and green combined edge templates consists of three individual weighted templates created using said parameter of interest±twenty percent of an operating range for said parameter of interest.

3. The tactical image parameter adjustment method of claim 2 wherein twenty percent of said operating range for said parameter of interest is initially set at 200 meters for the range of said tactical image.

4. The tactical image parameter adjustment method of claim 1 wherein said neural network uses a binary search to home in on said correct value for the range of said tactical image.

5. The tactical image parameter adjustment method of claim 2 wherein weighted values for the three weighted individual templates of said red edge template are 0.0, 0.5, and 1.0, and the weighted values for the three weighted individual templates of said green edge template are 1.0, 0.5 and 0.0.

6. The tactical image parameter adjustment method of claim 1 wherein said neural network comprises a back propagation neural network.

7. The tactical image parameter adjustment method of claim 1 wherein 2000 sets of said first, second and third correlation values are standardized for input to said neural network.

8. The tactical image parameter adjustment method of claim 1 wherein said first correlation values is a ratio of a red peak value over a green peak value, said second correlation value is a ratio of a red peak height over a red peak width, and said third correlation value is a ratio for a green peak height over a green peak width.

9. A tactical image parameter adjustment method for stereo pair correlation for determining a range and a heading for a tactical image comprising one or more computers implementing in the following steps:
(a) providing tactical image position data generated by a sensor;
(b) providing stereo image pairs which are stored within an image library wherein said stereo image pairs are based on a rough estimate of sensor position;
(c) generating an edge image template from said tactical image position data for use in a correlation process;
(d) generating first and second red and green combined edge templates in frequency spaces wherein each of said red and green combined edge templates consists of a preset number of differently weighted individual templates created using a parameter of interest;
(e) correlating said edge image template with said first and second red and green combined edge templates to provide first and second correlation surfaces;
(f) locating peak and minimum values in each of said frequency spaces in said first and second correlation surfaces;
(g) subtracting the minimum value from the peak value for each of said frequency spaces in said first and second correlation surfaces;
(h) generating first, second and third correlation values as inputs to a pair of back-propagated neural network wherein said first, second and third correlation are ratios of selected values of peak widths, peak heights and said peak values;
(i) standardizing said first, second and third correlation values to fall between 0.0 and 1.0; and (j) providing a first set of said first, second and third correlation values standardized to fall between 0.0 and 1.0 to said pair of back propagated neural networks, wherein said pair of back propagated neural network determines a search direction upon receiving said first set of said first, second and third correlation values;
(k) providing a plurality of additional sets of said first, second and third correlation values to said pair of back propagated neural networks, each of said pair of back propagated neural networks using the additional sets of said first, second and third correlation values to indicate when a parameter value for said parameter of interest is larger or smaller than a correct position parameter for said parameter of interest; and
(l) adjusting the parameter value for said parameter of interest until said correct position parameter for said parameter of interest is obtained by looping through steps (d)-(l) of said tactical image parameter adjustment method.

10. The tactical image parameter adjustment method of claim 9 wherein each of said red and green combined edge templates consists of three weighted individual templates created using said parameter of interest±twenty percent of an operating range for said parameter of interest.

11. The tactical image parameter adjustment method of claim 10 wherein twenty percent of said operating range for said parameter of interest is initially set at 200 meters when the range of said tactical image is said parameter of interest.

12. The tactical image parameter adjustment method of claim 10 wherein twenty percent of said operating range for said parameter of interest is initially set at one degree when the heading for said tactical image is said parameter of interest.

13. The tactical image parameter adjustment method of claim 10 wherein weighted values for the three weighted individual templates of said red edge template are 0.0, 0.5, and 1.0, and the weighted values for the three weighted individual templates of said green edge template are 1.0, 0.5 and 0.0.

14. The tactical image parameter adjustment method of claim 9 wherein 2000 sets of said first, second and third correlation values are standardized for input to said back propagated neural network.

15. A tactical image parameter adjustment method for stereo pair correlation for determining a range and a heading for a tactical image comprising one or more computers implementing in the following steps:
(a) providing tactical image position data generated by a sensor;
(b) providing stereo image pairs which are stored within an image library wherein said stereo image pairs are based on a rough estimate of sensor position;
(c) generating an edge image template from said tactical image position data for use in a correlation process;
(d) generating first and second red and green combined edge templates in frequency spaces wherein each of said red and green combined edge templates consists of three weighted individual templates created using a parameter of interest, wherein weighted values for the three weighted individual templates of said red edge template are 0.0, 0.5, and 1.0, and the weighted values for the three weighted individual templates of said green edge template are 1.0, 0.5 and 0.0;
(e) correlating said edge image template with said first and second red and green combined edge templates to provide first and second correlation surfaces;

(f) locating peak and minimum values in each of said frequency spaces in said first and second correlation surfaces;
(g) subtracting the minimum value from the peak value for each of said frequency spaces in said first and second correlation surfaces;
(h) generating first, second and third correlation values as inputs to a pair of back-propagated neural network wherein said first, second and third correlation are ratios of selected values of peak widths, peak heights and said peak values;
(i) standardizing said first, second and third correlation values to fall between 0.0 and 1.0; and
(j) providing a first set of said first, second and third correlation values standardized to fall between 0.0 and 1.0 to said pair of back propagated neural networks, wherein said pair of back propagated neural network determines a search direction upon receiving said first set of said first, second and third correlation values;
(k) providing a plurality of additional sets of said first, second and third correlation values to said pair of back propagated neural networks, each of said pair of back propagated neural networks using the additional sets of said first, second and third correlation values to indicate when a parameter value for said parameter of interest is larger or smaller than a correct position parameter for said parameter of interest;
(l) adjusting the parameter value for said parameter of interest by adjusting a step size for said parameter of interest by approximately fifty percent until said correct position parameter is obtained, said correct position parameter being obtained by looping through steps (d)-(l) of said tactical image parameter adjustment method.

16. The tactical image parameter adjustment method of claim 15 wherein the first of said pair of back propagated neural networks uses a binary search to home in on the correct position parameter for the range of said tactical image and the second of said pair of back propagated neural networks uses said binary search to home in on the correct position parameter for the heading for said tactical image.

17. The tactical image parameter adjustment method of claim 15 wherein each of said red and green combined edge templates consists of the three individual weighted templates created using said parameter of interest±twenty percent of an operating range for said parameter of interest.

18. The tactical image parameter adjustment method of claim 17 wherein twenty percent of said operating range for said parameter of interest is initially set at 200 meters when the range of said tactical image is said parameter of interest.

19. The tactical image parameter adjustment method of claim 17 wherein twenty percent of said operating range for said parameter of interest is initially set at one degree when the heading for said tactical image is said parameter of interest.

20. The tactical image parameter adjustment method of claim 15 wherein 2000 sets of said first, second and third correlation values are standardized for input to said back propagated neural network.

* * * * *